United States Patent [19]

Just et al.

[11] Patent Number: 4,954,268

[45] Date of Patent: Sep. 4, 1990

[54] PROCESS FOR REMOVING CELLULOSE ETHERS FROM A CELLULOSE ETHER SUSPENSION

[76] Inventors: Guenther Just, Verdistrasse 48, 4010 Hilden; Willi Wuest, Fasenenring 32, 4030 Ratingen, both of Fed. Rep. of Germany

[21] Appl. No.: 306,427

[22] Filed: Feb. 3, 1989

[30] Foreign Application Priority Data

Feb. 5, 1988 [DE] Fed. Rep. of Germany ....... 3803370

[51] Int. Cl.$^5$ .............................................. B01D 33/48
[52] U.S. Cl. ..................................... 210/772; 210/784; 210/798; 210/393; 210/402; 210/411; 210/489; 210/499; 536/85
[58] Field of Search ............... 210/784, 798, 358, 393, 210/402, 411, 503, 505, 489, 772, 499; 536/84, 85

[56] References Cited

U.S. PATENT DOCUMENTS

| 2,352,304 | 6/1944 | Young | 210/798 |
| 2,814,620 | 11/1957 | Stewart et al. | 536/85 |
| 3,592,341 | 7/1971 | Emmett, Jr. et al. | 210/784 |
| 4,132,642 | 1/1979 | Müller et al. | 210/778 |
| 4,728,422 | 3/1988 | Bailey | 210/489 |

*Primary Examiner*—Peter Hruskoci
*Assistant Examiner*—Krisanne Shideler
*Attorney, Agent, or Firm*—Real J. Grandmaison; Wayne C. Jaeschke; James K. Luchs

[57] ABSTRACT

A process is disclosed for recovering a cellulose ether from a cellulose ether suspension in which the cellulose ether is recovered as a filter cake from a pressure filtration, particularly using a rotary pressure filter. Clogging of the separation or filtration device is avoided, providing for a long useful life. A multi-layer wire mesh filter medium is employed, formed of mesh layers of different wire thicknesses and/or mesh size. After removal of the filter cake, the filter medium is cleaned with steam, compressed air or pressurized water.

20 Claims, 2 Drawing Sheets

PROCESS FOR REMOVING CELLULOSE ETHERS FROM A CELLULOSE ETHER SUSPENSION

BACKGROUND OF THE INVENTION

1. Field of the Invention

The invention relates to a process for removing cellulose ethers, especially cellulose ethers with plastic properties and/or a high flocculation point, from a cellulose ether suspension, in which the cellulose ethers are removed as the filter cake by pressure filtration, especially in a rotary pressure filter.

2. Description of Related Art

Cellulose ether is prepared by etherification of alkali cellulose with methyl chloride at temperatures of about 92° to 110° C., as is described in detail in Ullmanns *Enzyklopadie der technischen Chemie* (Ullmanns Encyclopedia of Industrial Chemistry), 4th Ed., vol. 9, p. 205. In process, following the etherification reaction, the reaction mixture formed is introduced into an agitator vessel containing deionized water at about 95° C. In the agitator vessel, the sodium chloride formed during the reaction is dissolved out, and the residual alkali that is still present is neutralized. The suspension that leaves the agitator vessel must then be subjected to a separation in order to obtain the desired pure cellulose ether.

In known processes, this separation is performed almost exclusively on screen centrifuges. However, one drawback of such screen centrifuges is the high loss of useful product that occurs upon impact. In addition, screen centrifuges are not suitable for products with high flocculation points or plastic properties.

Therefore attempts have previously been made to perform the workup of cellulose ethers on rotary pressure filters. However, under the extreme process conditions used, namely comparatively high pressures and high temperatures, the customary textile filter coverings for pressure filters cause problems. For example, the alternating pressure stress causes stretching, material fatigue, and ripping out of the textile fabric, and in addition the fabric shows a strong tendency to stick. Furthermore, the fabric can no longer be cleaned even by intensive rinsing, so that it becomes unusable after only a short filtration time.

DESCRIPTION OF THE INVENTION

Figure 1:
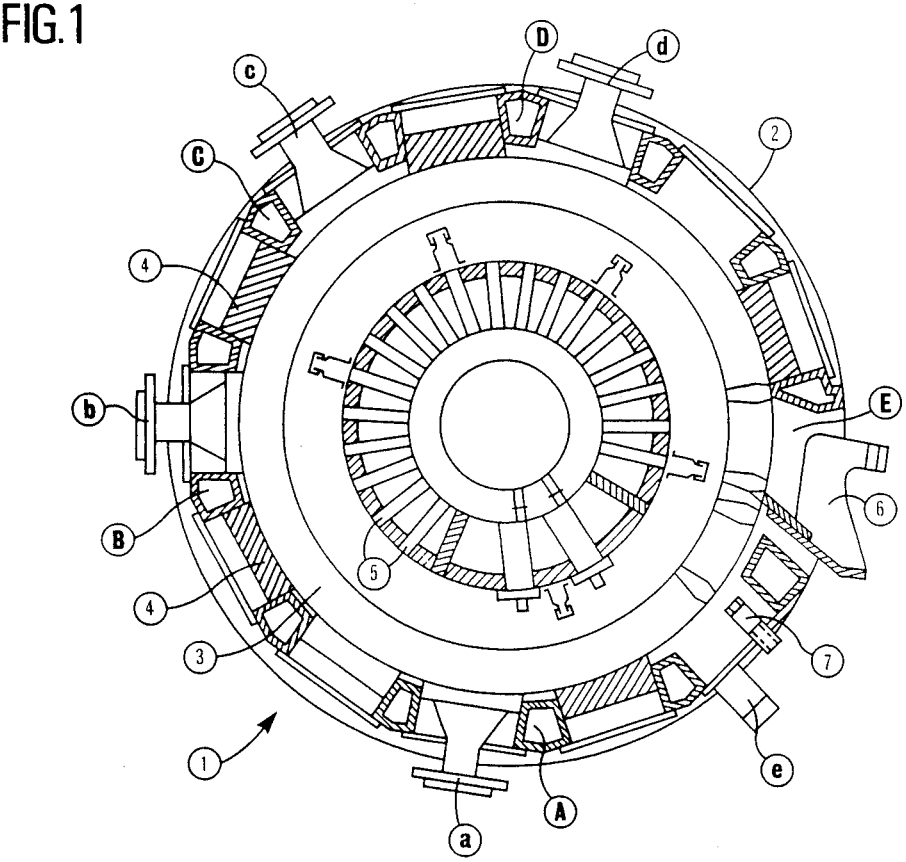
FIG. 1 illustrates a pressure filter in cross section.

Other than in the operating examples, or where otherwise indicated, all numbers expressing quantities of ingredients or reaction conditions used herein are to be understood as modified in all instances by the term "about".

An object of this invention is to provide a process for the removal of cellulose ethers, especially of cellulose ethers with plastic properties and/or a high flocculation point, i.e. above 75° C., and more generally above 85° C., from a cellulose ether suspension, wherein clogging of the separation or filtration device is avoided, and a separation device is provided which manifests a long useful life.

This object is achieved in the present invention with a process of the type initially described wherein the separation is performed in a pressure filter, preferably a rotary pressure filter, with a multi-layer, preferably sintered metal wire mesh as a filter medium, wherein the wire mesh is formed from mesh layers of different wire thickness and/or mesh size, and that after removal of the filter cake, the filter medium is cleaned with steam, compressed air, or pressurized water.

Using the method of this invention, removal of the cellulose ethers is achieved without the problems noted earlier, since after the filtration, the filter medium is cleaned, and thus no clogging of the filter medium takes place. At the same time, the cleaning of the filter medium provides for the useful product remaining in the filter medium to also be washed out, so that no losses of desirable product occur. In addition, through the use of a multi-layer wire mesh, a high useful extended life of the separation device is provided. Wire mesh of this type is especially useful for removing cellulose ethers with plastic properties and/or high flocculation point.

In its embodiment the invention provides for a multi-layer square mesh fabric in linen binding with a filter cloth surrounded on each side with at least one protective mesh to be used as the filter medium. In this process the filter cloth serves as the actual filter medium, while the protective meshes on both sides ensure high mechanical strength of the wire mesh with respect to the alternating pressure stresses that arise.

For removing the cellulose ether it is especially advantageous if the filter medium used comprises a four-layer square-hole mesh in linen binding with a first upper layer protective mesh, a second filter cloth layer, a third lower protective mesh layer, and a fourth layer supporting mesh. It has been found that this structure of the filter medium shows especially advantageous separating properties, and does not have a tendency toward clogging or filter breakthrough.

It is advantageous to use a four-layer wire mesh, the upper protective mesh of which has a mesh size approximately 3 times the mesh size of the filter fabric, the lower protective layer about 5 times, and the supporting layer about 13 times. As a result of this embodiment of the mesh sizes of the wire mesh laminate, an optimum of free passage and mesh stability is achieved.

In a particularly advantageous embodiment the invention provides for the use of a filter cloth, the mesh size of which corresponds approximately to the mean particle diameter of the suspension particles. Specifically, it has been found that a filter cloth of this type reliably retains all suspension particles, even particles with diameters smaller than the mesh size of the filter cloth, so that no filter breakthrough takes place.

To avoid corrosion it is planned that a wire mesh consisting of a highly corrosion-resistant stainless steel, especially one with more than 50 weight percent non-ferrous components, specifically nickel and chromium, should be used. The use of these materials prevents the occurrence of stress crack corrosion due to the high salt content of the hot suspension.

To achieve a high space-time yield and especially low losses of desirable product, it is contemplated that a highly concentrated cellulose ether suspension in a cellulose ether to water concentration ratio of 1:5 to 1:50 be used. A concentration ratio of 1:8 to 1:20, especially 1:10 to 1:15, is preferably used. The particular concentration employed is one which will ensure that the suspension used is still pumpable.

In addition, the invention provides that the filter cake, after filtration, be washed with hot water, i.e. about 50°-100° C. and/or steam, and then be loosened from the wire mesh prior to its removal by back-blowing of steam or hot air. As a result, the foreign materials, such as salts or the like, are washed out of the filter cake, so that the filter cake consists almost entirely of cellulose ether.

In a particularly advantageous embodiment the invention provides that after removal of the filter cake, the wire mesh is rinsed in the filtrate direction with hot water, i.e. about 50°-100° C. at an excess pressure of at least 10 and preferably 15 to 20 bar using flat jet nozzles. In this process it is planned that the rinse water obtained be returned for filter cake washing or used as batch makeup water. As a result, the filter medium is cleaned, and at the same time the desirable product remaining in the filter medium is recovered and returned to the process. Only a small portion of rinse liquid is required for this process, corresponding approximately to the quantity of wash water used in the filter cake washing.

In the following description, the invention will be explained in greater detail by way of example, based on the drawings.

FIG. 1 shows a rotary pressure filter 1 having a housing 2 of fixed position, and a filter drum 3 rotatable within it. The housing 2 is subdivided into five working chambers A to E, bounded by separating elements 4, wherein each separating element is pressed pneumatically against the filter drum 3. The sealing of the moving parts is accomplished with an elastomer sealing frame or a membrane seal. The sealing off of the rotating drum 3 to the sides against the fixed housing 2 takes place by means of glands, not shown in greater detail in the drawing. To each working chamber A through E, a port a through e is assigned.

Figure 2:
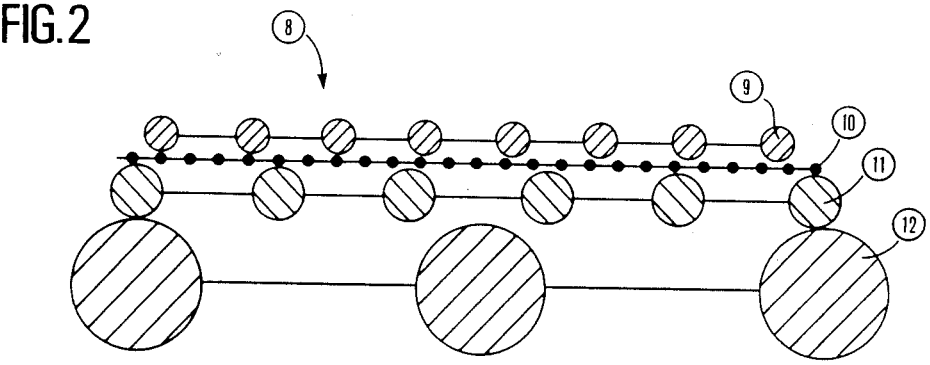
FIG. 2 is a schematic representation of a multi-layer wire mesh as a filter medium in cross section.

The filter drum 3 is subdivided by separating strips and separating rings into filter cells, in which the four-layer metal wire meshes shown in greater detail in FIG. 2 are placed. The filtrate from these filter cells is conveyed out of the pressure filter 1 via filtrate pipes 5.

In the working chamber E, a scraper 6 and flat jet nozzles 7 are arranged for spraying water on the metal wire mesh.

FIG. 2 shows a four-layer metal wire mesh 8 that consists of an upper protective mesh 9, a filter cloth 10, a protective mesh 11, and finally a supporting mesh 12.

Figure 3:
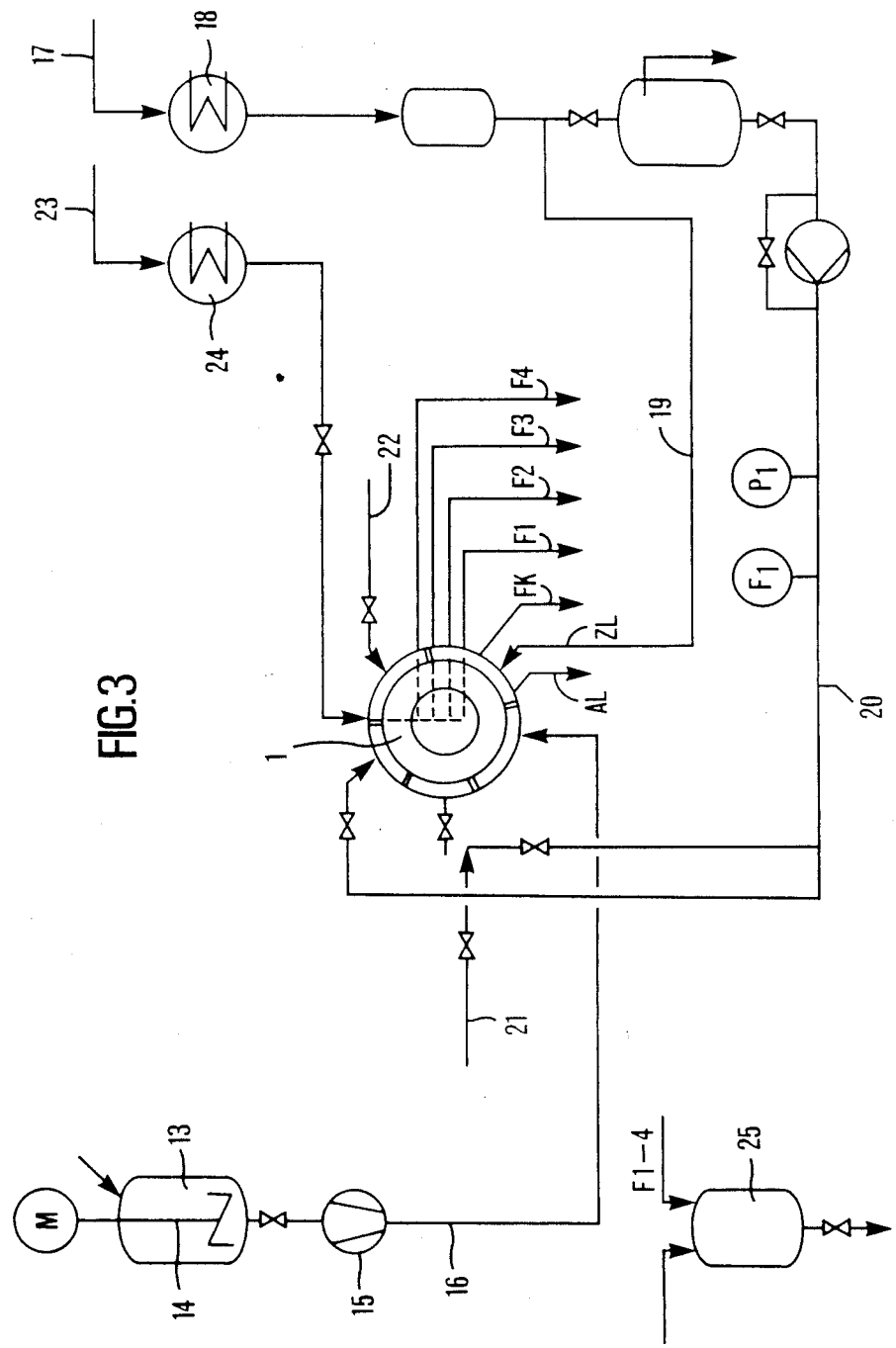
FIG. 3 is a simplified process flow diagram of a methylcellulose processing unit.

FIG. 3 shows a simplified process flow diagram of a methyl cellulose workup process, wherein the same reference symbols are used as in FIGS. 1 and 2 when the same parts are designated. An agitator vessel 13 with an agitator 14 has, at the container outlet, a pipeline 16 provided with a pump 15 for the cellulose ether suspension. A water line 17 passes over a heat exchanger 18 and splits into two feed lines 19 and 20. Two lines 21 and 22 serve to supply steam, water or compressed air to the rotary pressure filter 1. An air line 23 is conveyed over a heat exchanger 24 to the rotary pressure filter 1.

From the rotary pressure filter 1, filtrate lines F1 to F4 lead into a container 25. In addition the pressure filter 1 has an inflow line ZL and an outflow line AL as well as a line FK for the filter cake.

The filtration sequence proceeds as follows beginning with reference to FIG. 1:

A cellulose ether suspension is pumped under excess pressure through the port a into the working chamber A. While a filter cake composed of the solid cellulose ether is forming on the filter cells, the filtrate, which consists principally of water and dissolved salts, passes through the metal wire mesh into the filtrate tube 5. As a result of the rotary movement of the filter drum 3, the filter cells with the filter cake are conveyed into the working chamber B. In this chamber B the filter cake is washed out with pressurized steam introduced through port b. The washed-out salts flow through the metal wire mesh into the filtrate tube 5. In the working chamber C this washing process is repeated with pressurized hot water pumped in through port c.

Following the washing process in the working chambers B and C, the moisture content of the filter cake in chamber D is adjusted corresponding to the requirements in the subsequent processing steps. For this purpose, steam or compressed air or liquid with a low excess pressure is pumped into the chamber D. Finally, in the non-pressurized chamber E, removal of the filter cake and cleaning of the metal wire mesh takes place. First, the filter cake is loosened from the filter cell by back-blowing with compressed air or the like, and then it is removed with the scraper 6. Then the wire mesh is washed off with hot water that enters through the port e and is sprayed through the flat jet nozzle 7 onto the filter cells. As a result, the wire mesh is completely cleaned, and at the same time the desirable product, cellulose ether, remaining in the wire mesh is obtained with the rinse water. In order to prevent the rinse water entering under pressure from reaching the area of the scraper 6, it is possible to arrange between the scraper 6 and the flat jet nozzle 7 a separating element, not shown in detail in FIG. 1.

In FIG. 2 the four-layer metal wire mesh 8 serving as the filter medium is shown. First the filtrate passes through the upper protective mesh 9, then through the filter cloth 10, the lower protective mesh 11, and finally through the supporting mesh 12. The individual wire meshes 9 to 12 are woven as square-hole meshes in linen binding, a fact that is not shown in detail in FIG. 2. The actual filter cloth 10 is fine-meshed and has fine wires, and is surrounded by the coarser protective meshes 9 and 11 as well as by the supporting mesh 12. In this process the upper protective mesh 9 has a mesh size of 250 micro m, the filter cloth 10 a mesh size of 75 micro m, the lower protective mesh 11 a mesh size of 400 micro m, and the lower supporting mesh 12 a mesh size of 1000 micro m.

The four-layer wire mesh 8 is sintered and consists of a highly corrosion-resistant material.

FIG. 3 shows a simplified process flow diagram for methyl cellulose workup.

From the agitator vessel 13 with the agitator 14 a cellulose ether suspension is conveyed over pump 15 through pipeline 16 into the pressure filter 1 (into chamber A according to FIG. 1). Over water line 17, water passes through the heat exchanger 18, in which it is heated, and over additional apparatus (the details of which are not described as they are not necessary or important for understanding of the invention), into the two feed lines 19 and 20. Through pipeline 19, the water is conveyed into the chamber E of the rotary pressure filter 1 for filter cloth washing, which is designated by ZL in the drawing. The emerging rinse water in which cellulose ether washed out of the filter cloth is present is conveyed away over the effluent line AL, and can for example be introduced into the wash chamber C.

Via the water line 20, the hot, pressurized water is conveyed into the wash chamber C, and if needed, also B of the rotary pressure filter 1. Low pressure steam to a maximum of 3 bar is conveyed through the pipeline 21 into the wash chamber B of the pressure filter Correspondingly, over pipeline 22, steam enters the drying chamber D of the rotary pressure filter 1. Through pipeline 23, air, heated in the heat exchanger 24, is conveyed into the rotary pressure filter 1, as required for back-blowing and loosening of the filter cake from the wire filter cloth into the working chamber E.

The filtrate obtained in the working chambers A through D of the rotary pressure filter 1 is led out through the filtrate lines F1 to F4 and introduced into the container 25. After removal, the filter cake, consisting of the desired product, cellulose ether, is taken off through a pipeline FK into the working chamber E of the pressure filter 1 and subjected to further processing.

The invention is illustrated by the following example, which is given for illustration purposes only and is not meant to limit the invention.

EXAMPLE I

A methylhydroxyethylcellulose (MHEC with 23% CHO groups and 9% hydroxyethyl groups, and a flocculation point of 88° C.) on the basis of powdered cellulose with 34% moisture and 26% sodium chloride content was mixed with boiling water to produce a bath ratio of 1:8.6 (1 part MHEC/8.6 parts water).

The suspension was conveyed to a rotary pressure filter, preheated to 100° C., with a filter surface area of 1 mz and 1 drum rotation per minute under a pumping pressure of 2 bar. The filter surface consisted of a four-layer sintered metal mesh in square linen binding of the following dimensions (sequence in filtrate flow direction):

| No. | Mesh size | Wire thickness |
| --- | --- | --- |
| 1 | 250 micro m | 160 micro m (upper protective mesh) |
| 2 | 75 micro m | 50 micro m (filter cloth) |
| 3 | 400 micro m | 250 micro m (lower protective mesh) |
| 4 | 1000 micro m | 630 micro m (supporting mesh) |

The open filter surface of this laminate, made of stainless chromium steel, was 35%.

On the filter surface, a closed filter cake of 20 mm thickness was formed, and it was then intensively blown out with steam at 2 bar, leading to a marked reduction of the residual sodium chloride content.

Hot water washing and compressed air blowing in the filtrate direction followed before removal of the cake took place. For this purpose, back blowing was first conducted with compressed air for the purpose of loosening, and then the solid was removed from the filter surface with the scraper.

Following removal of the cake, intensive cleaning of the metal wire mesh laminates was performed by hot water spraying with hot jet nozzles at at least 10 and preferably 15-20 bar. Then the cycle described was similarly repeated, wherein performance comparisons over many hours did not reveal declining filter throughput.

The quantities measured per hour and the values derived from them are as follows:

|  | Kg | % NaCl | % Org.S. |
| --- | --- | --- | --- |
| Suspension input | 6230 |  |  |
| Wash water, total | 670 |  |  |
| 1st filtrate | 5100 | 7.05 | 0.85 |
| 2nd filtrate (steam admission) | 280 | 7.35 | 0.95 |
| 3rd filtrate (water washing) | 55 | 7.15 | 0.90 |
| 4th filtrate (dry blowing) | 205 | 6.90 | 0.85 |
| Mesh rinse water | 600 |  |  |
| Yield (absolute dry weight) | 560 kg |  |  |
| Moisture in the cake | 55% |  |  |
| Salt content | 0.2% |  |  |
| Losses (including hemicell.) | 7.9% |  |  |

Naturally the invention is not limited to the exemplified embodiment. Additional embodiments are possible without departing from the basic concept. Thus in certain application instances it may be provided that the washing of the metal wire mesh fabric be carried out by hot water spraying with flat jet nozzles at pressures of more than 100 bar. In addition, the process in accordance with the invention is not limited to use on rotary pressure filters. The process sequence can also be carried out with the appropriate modifications in pressure filter funnels operating batchwise.

We claim:

1. In a process for removing cellulose ethers from a cellulose ether particle suspension in which the cellulose ethers are recovered as a filter cake from a pressure filtration, the improvement wherein said pressure filtration is conducted in a rotary pressure filter containing a multi-layered wire mesh filter medium comprised of mesh layers having different mesh sizes wherein said filter medium comprises a multi-layer square-opening mesh, linen-bonded to a filter cloth with at least one protective mesh on each side and wherein said filter cloth has a mesh size corresponding to about the mean particle diameter size of the cellulose ether suspension particles and, subsequent to removal of said filter cake from said filter medium, said filter medium is cleaned with steam, compressed air or water under pressure.

2. A process as defined in claim 1, wherein said filter medium comprises a four-layer, square-opening mesh in linen binding containing (a) a first upper protective mesh layer; (b) a second filter cloth layer; (c) a third lower protective mesh layer and (d) a fourth supporting mesh layer.

3. A process as defined in claim 2 wherein said upper protective layer (a) is a wire mesh having a mesh size about 3 times that of said filter cloth layer (b), said lower protective mesh layer (c) is a wire mesh having a mesh size about 5 times that of said filter cloth (b) and said supporting mesh layer (d) is a wire mesh having a mesh size about 13 times that of said filter cloth layer (b).

4. A process as defined in claim 2 wherein said layers (a), (c) and (d) are comprised of wire mesh of corrosion-resistant stainless steel.

5. A process as defined in claim 4 wherein said stainless steel contains more than 50% weight percent non-ferrous fraction selected from the group consisting of nickel and chromium.

6. A process as defined in claim 1 wherein said cellulose ether suspension comprises a cellulose ether in water in a weight ratio of about 1:5 to about 1:50.

7. A process as defined in claim 6 wherein said ratio by weight is in the range of about 1:8 to about 1:20.

8. A process as defined in claim 6 wherein said ratio by weight is about 1:10 to about 1:15.

9. A process as defined in claim 6 wherein said cellulose ether is methyl cellulose.

10. A process as defined in claim 9 wherein said methyl cellulose has a flocculation point above 75°.

11. A process as defined in claim 6 wherein said cellulose ether is methyl cellulose having a flocculation point above 85° C.

12. A process as defined in claim 1 wherein said filter cake is washed with hot water or steam and subsequently loosened from said filter medium by back-blowing of steam or compressed air prior to removal from said filter medium.

13. A process as defined in claim 12 wherein after removal of said filter cake from said filter medium, said filter medium is rinsed in the filtrate direction with hot water at an excess pressure of at least 10 bar.

14. A process as defined in claim 13 wherein said excess pressure is in the range of about 15 to about 20 bar.

15. A process as defined in claim 13 wherein said (hot water rinse is) filter medium is rinsed with hot water conducted with flat-jet nozzles.

16. A process as defined in claim 13 wherein said hot water (rinse) is recycled for washing said filter cake.

17. A process for removing a cellulose ether from an aqueous cellulose ether suspension comprising (1) pressure filtering said suspension in a rotary pressure filter containing a filter medium, said filter medium comprising a multi-layered, square-opening wire mesh, linen-bonded to a filter cloth with at least one protective wire mesh on each side of said filter cloth, the upper layer protective wire mesh having a mesh size about 3 times that of said filter cloth and the lower protective wire mesh layer having a mesh size about 5 times that of said filter cloth, said filter medium further comprising a supporting wire mesh layer having a wire mesh about 13 times that of said filter cloth, said filter cloth having a mesh size corresponding to about the mean particle size diameter of the cellulose ether suspension particles;
(2) washing the filter cake resulting from said filtering step (1) with hot water or steam;
(3) loosening said filter cake from said filter medium by back-blowing with steam or compressed air; and
(4) removing said filter cake from said filter medium.

18. A process as defined in claim 17 wherein said wire mesh is corrosion-resistant stainless steel.

19. A process as defined in claim 17 wherein said cellulose ether is methyl cellulose.

20. A multi-layered wire mesh filter medium for pressure filtration of an aqueous cellulose ether particle suspension to recover a cellulose ether comprising a multi-layer mesh linen-bonded to a filter cloth with at least one protective wire mesh on each side of said filter cloth, the upper protective wire mesh layer having a mesh size about five times that of said filter cloth, said filter medium further comprising a supporting wire mesh layer having a stainless steel wire mesh about thirteen times that of said filter cloth, said filter cloth having a mesh size corresponding to about the mean size diameter of the cellulose ether suspension particles.

* * * * *

UNITED STATES PATENT AND TRADEMARK OFFICE
CERTIFICATE OF CORRECTION

PATENT NO. : 4,954,268

DATED : February 3, 1989

INVENTOR(S) : Guenther Just, et al.

It is certified that error appears in the above-identified patent and that said Letters Patent is hereby corrected as shown below:

Title page: Item (73) Assignee; should read ---
Aqualon GmbH Co. KG, Paul-Thomas-Strass 58, D-4000
Duesseldorf 13, Germany--.

Signed and Sealed this

Twenty-eighth Day of April, 1992

Attest:

HARRY F. MANBECK, JR.

*Attesting Officer*    *Commissioner of Patents and Trademarks*